(12) United States Patent
Topol et al.

(10) Patent No.: US 10,233,948 B2
(45) Date of Patent: Mar. 19, 2019

(54) GAS TURBINE BLADE ARRAY WITH REDUCED ACOUSTIC OUTPUT

(71) Applicant: UNITED TECHNOLOGIES CORPORATION, Farmington, CT (US)

(72) Inventors: David A. Topol, West Hartford, CT (US); Dilip Prasad, Newbury Park, CA (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 658 days.

(21) Appl. No.: 14/768,839

(22) PCT Filed: Dec. 18, 2013

(86) PCT No.: PCT/US2013/075946
§ 371 (c)(1),
(2) Date: Aug. 19, 2015

(87) PCT Pub. No.: WO2014/143280
PCT Pub. Date: Sep. 18, 2014

(65) Prior Publication Data
US 2016/0003264 A1 Jan. 7, 2016

Related U.S. Application Data

(60) Provisional application No. 61/787,535, filed on Mar. 15, 2013.

(51) Int. Cl.
*F04D 29/66* (2006.01)
*F01D 5/14* (2006.01)
(Continued)

(52) U.S. Cl.
CPC ............ *F04D 29/666* (2013.01); *F01D 5/06* (2013.01); *F01D 5/10* (2013.01); *F01D 5/145* (2013.01);
(Continued)

(58) Field of Classification Search
CPC ............ F05B 2260/96; F05B 2260/962; F05B 2260/964; F04D 29/664; F04D 29/666;
(Continued)

(56) References Cited

U.S. PATENT DOCUMENTS 4,137,992 A 2/1979 Herman
5,498,127 A 3/1996 Kraft et al.
(Continued)

FOREIGN PATENT DOCUMENTS

EP 2251261 A2 11/2010

OTHER PUBLICATIONS

Supplementary European Search Report for Application No. EP 13 87 80763.
(Continued)

*Primary Examiner* — Mark Laurenzi
*Assistant Examiner* — Mickey France
(74) *Attorney, Agent, or Firm* — Cantor Colburn LLP

(57) ABSTRACT

In accordance with one aspect of the disclosure, a rotor for a gas turbine engine is disclosed. The rotor may include a rotor disk and a plurality of blade extending radially outward from the rotor disk. At least one of the blades may have a physical nonuniformity. The blades may be distributed about the rotor disk based on any physical nonuniformities of the blades to generate at least one decay-resistant harmonic.

16 Claims, 4 Drawing Sheets

(51) Int. Cl.
*F04D 29/32* (2006.01)
*F01D 5/06* (2006.01)
*F01D 5/10* (2006.01)

(52) U.S. Cl.
CPC ........ *F04D 29/321* (2013.01); *F05D 2220/36* (2013.01); *F05D 2260/961* (2013.01); *Y02T 50/671* (2013.01); *Y02T 50/673* (2013.01)

(58) Field of Classification Search
CPC .... F04D 29/668; F04D 29/663; F04D 29/321; F02C 7/045; F01D 5/145; F01D 5/06; F01D 5/10; F05D 2220/36; F05D 2220/961; Y02T 50/671; Y02T 50/673
USPC .................................. 415/119; 416/1, 223 A
See application file for complete search history.

(56) References Cited

U.S. PATENT DOCUMENTS

| | | |
|---|---|---|
| 5,966,525 A | 10/1999 | Manzi et al. |
| 5,979,593 A | 11/1999 | Rice et al. |
| 2006/0029493 A1 | 2/2006 | Schwaller et al. |
| 2007/0102234 A1 | 5/2007 | Prasad et al. |

OTHER PUBLICATIONS

International Search Report for related PCT Application No. PCT/US13/75946; report dated Apr. 7, 2014.

GAS TURBINE BLADE ARRAY WITH REDUCED ACOUSTIC OUTPUT

CROSS-REFERENCE TO RELATED APPLICATIONS

This patent application is a 35 USC § 371 U.S. national stage filing of International Patent Application No. PCT/US13/75946 filed on Dec. 18, 2013, which claims priority under the 35 USC § 119(e) to U.S. Provisional Patent Application Ser. No. 61/787,535, filed on Mar. 15, 2013.

FIELD OF THE DISCLOSURE

The present disclosure generally relates to gas turbine engines and, more specifically, relates to noise reduction configurations for fans of gas turbine engines.

BACKGROUND OF THE DISCLOSURE

Gas turbine engines generally have a plurality of axially aligned components including a fan, a compressor section, a combustor, and a turbine section. The fan, positioned at a forward end of the engine, rotates to draw in and pressurize ambient air. Some of the accelerated air flows to the compressor section, as a core flow, where the air is compressed and then flows to the combustor. At the combustor, the compressed air is mixed with fuel and combusted to form an exhaust. The exhaust expands from the combustor through the turbine section, causing turbines of the turbine section to rotate, and then flowing out of the engine at an aft end of the engine. The rotation of the turbines drives the rotation of the fan and compressors by way of a shaft, or a plurality of concentrically mounted shafts in the case of a multi-spool engine. It can therefore be seen that once this process has begun it is self sustaining.

A nacelle surrounds the engine and includes an inlet forward of the fan. The fan typically includes a central hub, or rotor disk, and a plurality of blades radially extending outward from the hub. When the fan rotates at a sufficiently high speed, the most radially distant extent of the blades, a tip of each blade, travels at supersonic speeds and generates an aerodynamic shock that generally travels in the forward direction.

Since the blades may possesses slight, but acceptable, structural and alignment differences incurred during manufacture and installation, the shock produced by each blade may travel at different speeds and/or with different orientations. These different shocks interact with each other and the inlet to produce a time varying air pressure pattern that repeats upon the completion of each rotation of the fan, also known as combination tone noise, multiple pure tone noise, or "buzz saw" noise. This combination tone noise travels in the forward direction out of the inlet and may be undesirable to people in a cabin of an aircraft utilizing the engine and in a community around the aircraft.

Many methods of reducing the noise generated by the engine in this fashion have been developed. One such method may include positioning the blades of the fan in an arrangement to force decay-prone harmonics to be generated by the fan. These decay-prone harmonics then decay in the inlet as described in the U.S. Pat. No. 5,966,525. Another method may be to actively shift all harmonics to higher orders and then attenuate the harmonics with an acoustic liner, such as in the U.S. Pat. No. 5,979,593.

While effective, new engine designs may generate decay-prone harmonics too closely to a lip of the inlet of the nacelle to effectively decay in the inlet. Further, active methods of noise reduction require moving components and/or electricity. Such components are maintenance intensive and any electricity usage drains output from the engine. Therefore, a new passive method for reducing the noise generated by the fan is needed.

SUMMARY OF THE DISCLOSURE

In accordance with one aspect of the disclosure, a rotor for a gas turbine engine is disclosed. The rotor may include a rotor disk and a plurality of blade extending radially outward from the rotor disk. At least one of the blades may have a physical nonuniformity. The blades may be distributed about the rotor disk based on any physical nonuniformities of the blades to generate at least one decay-resistant harmonic.

In a refinement, all the blades may cooperate to generate a single dominant decay-resistant harmonic.

In another refinement, each blade may have a pitch angle, a leading edge position, and an angular offset relative to a circumferentially adjacent blade. The physical nonuniformity of any blade may be at least one of the pitch angle, the leading edge position, and the angular offset.

In another refinement, the blades may be distributed to form a plurality of decay-resistant harmonics.

In yet another refinement, an acoustic liner may be positioned proximate the rotor within the gas turbine engine.

In a further refinement, the acoustic liner may be configured to attenuate an amplitude of a dominant decay-resistant harmonic of the rotor.

In another further refinement, the acoustic liner may be configured to attenuate an amplitude of a plurality of decay-resistant harmonics of the rotor.

In still another refinement, the rotor may be a fan of a gas turbine engine.

In accordance with another aspect of the present disclosure, a method of reducing combination tone noise in a rotor of a gas turbine engine is disclosed. The method may include, distributing a plurality of blades about a rotor disk of the rotor such that the blades generate a decay-resistant harmonic.

In a refinement, the method may further include positioning the rotor within a gas turbine engine, such that an acoustic liner is positioned proximate the rotor.

In another refinement, the blades may be distributed such that a plurality of decay-resistant harmonics are generated by the blades.

In another refinement, the method may further include determining a distribution of the blades based on at least one physical nonuniformity of at least one blade before distributing the blades about the disk.

In a further refinement, each blade may have a pitch angle, a leading edge position, and an angular offset relative a circumferentially adjacent blade. Any physical nonuniformity of the blades used to determine blade distribution may be at least one of the pitch angle, the leading edge position, and the angular offset.

In still another refinement, the method may further include providing the rotor as a fan of a gas turbine engine.

In accordance with yet another aspect of the present disclosure, a method of mitigating combination tone noise generated by a rotor is disclosed. The method may include providing a rotor having a rotor disk and a plurality of blades. At least one blade may have a physical nonuniformity. The method may further include generating a decay-resistant harmonic with a particular positioning of the blades of the rotor based on any nonuniformities of the blades.

In a refinement, the method may further include attenuating an amplitude of the decay-resistant harmonic with an acoustic liner proximate the rotor.

In another refinement, the blades may be provided in a distribution that generates a plurality of decay-resistant harmonics.

In yet another refinement, the blades may cooperate to generate a dominant decay-resistant harmonic.

In still another refinement, each blade may have a pitch angle, a leading edge position, and an angular offset relative a circumferentially adjacent blade. Any physical nonuniformities of the blades used to determine the particular position of the blades may be at least one of the pitch angle, the leading edge position, and the angular offset.

In still another refinement, the method may further include providing the rotor as a fan of a gas turbine engine.

These and other aspects and features of the present disclosure will be better understood in light of the following detailed description when read in light of the accompanying drawings.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

Figure 1:
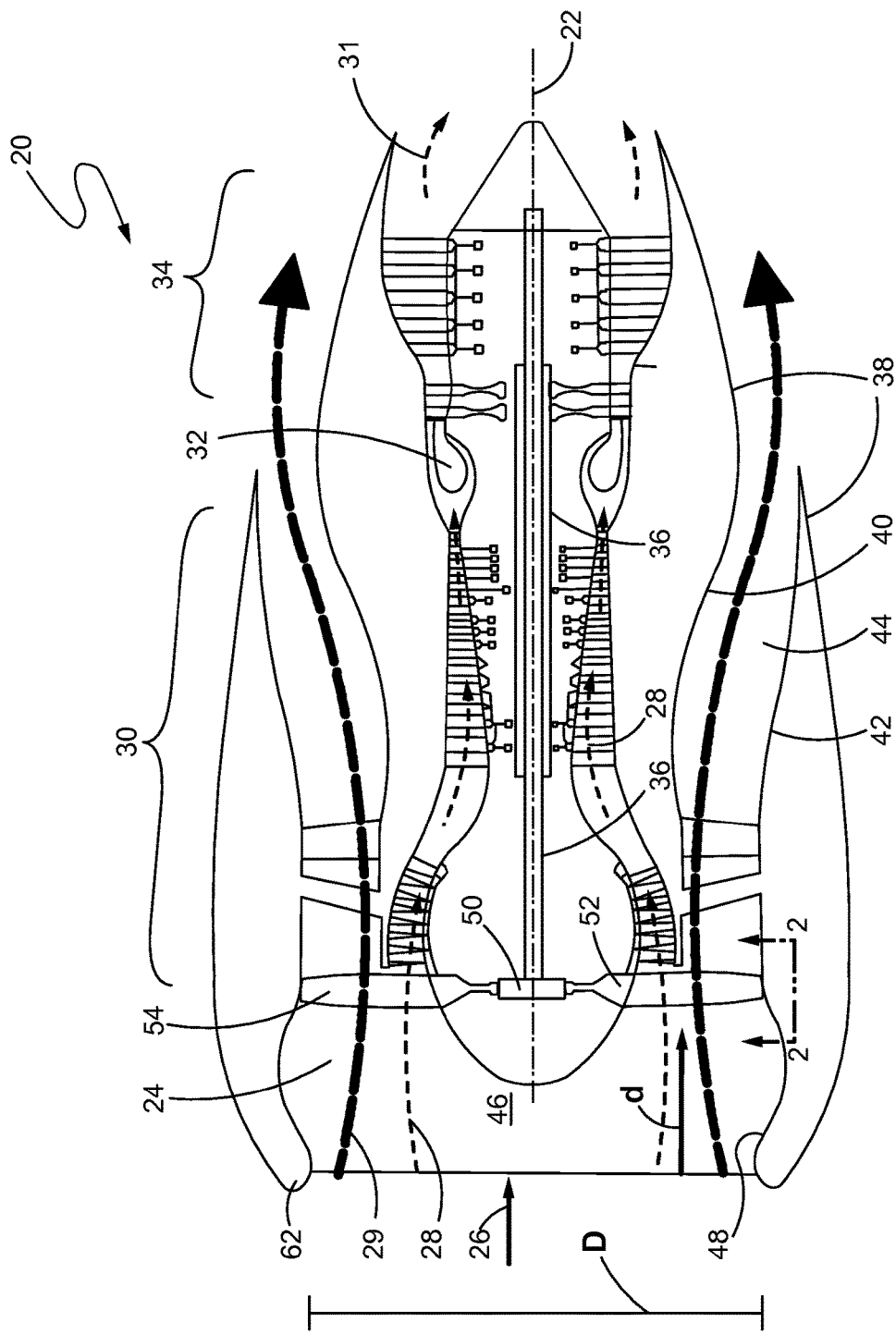
FIG. 1 is a cross-sectional view of a gas turbine engine constructed in accordance with an aspect of the present disclosure.

Referring now to the drawings, and with specific reference to FIG. 1, a gas turbine engine 20 is illustrated. As can be seen, the engine 20 includes a plurality of components axially aligned along a central axis 22. At a forward end of the engine 20 a fan 24 rotates to draw in and pressurize ambient air 26. This air is split into a core flow 28 and a bypass flow 29. The core flow 28 flows to a compressor section 30 where it is further compressed. From the compressor section 30, the compressed core flow 28 travels to a combustor 32 where the core flow 28 is mixed with a fuel and combusted to form an exhaust 31. The exhaust 31 expands through a turbine section 34 and exits the engine 20 at an aft end. As the exhaust 31 expands, it rotates turbines of the turbine section 34. This rotational motion is communicated to the fan 24 and compressor section 30 via an engine shaft 36, or plurality of engine shafts 36 in the case of a dual-spool engine 20 as shown.

A nacelle 38 typically surrounds the engine 20 and may include an inner wall 40 and an outer wall 42. The outer wall 42 may be spaced apart from and surround the inner wall 40 to form an air passage 44 therebetween for the bypass flow 29. At the forward end of the engine 20, the nacelle may extend forward of the engine 20 and form an inlet 46 for the ambient air 26 to flow into the nacelle 38 and then the engine 20. An acoustic liner 48 may be positioned radially interior to the outer wall 42 of the nacelle 38 in the inlet 46 or the outer wall 42 itself may act as the acoustic liner 48. In either case, the acoustic liner 48 acts to attenuate noise generated by the fan 24.

While the forgoing describes and illustrates a dual-spool turbofan gas turbine engine, it should be understood that the concepts described herein are not limited to use with such an engine and the teachings may be applied to other engines, such as single or triple spool engine configurations, or any rotor where noise is a concern.

The fan (or a rotor) 24 includes a hub (or a rotor disk) 50 and a plurality of blades 52 extending radially outward from the hub 50. Typically, these blades 52 each may include a physical nonuniformity that is incurred during manufacture or installation. The physical nonuniformities can be a pitch angle, a leading edge position, an angular offset relative a circumferentially adjacent blade, or the like. While these nonuniformities are acceptable for normal engine operation, they may cause excess undesirable noise that can be difficult to mask or counteract.

Figure 2:
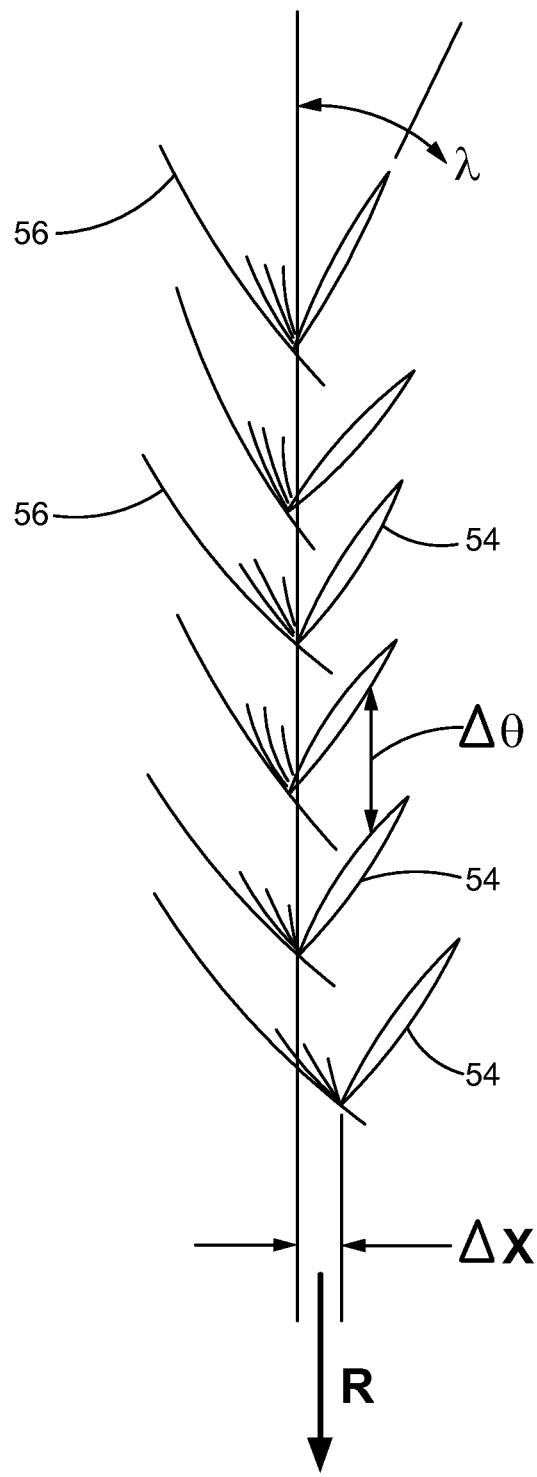
FIG. 2 is a perspective view of a plurality of blades taken along the line 2-2 of FIG. 1.

During operation, the fan 24 rotates in a direction R at a speed N, and a tip 54 of each blade 52 may move at supersonic speeds. When this occurs, an aerodynamic shock 56 may be generated as illustrated in FIG. 2. Because each of the blades 52 may have a physical nonuniformity the aerodynamic shock 56 of each blade 52 may also be different. These variations may be produced by a variation in pitch angle indicated by $\lambda$, a variation in a leading edge position indicated by $\Delta X$, a variation in circumferential separation between blades indicated by $\Delta\theta$, or the like. The nonuniformity of the blades 52 may cause the shocks 56 to propagate at different speeds or with different orientations.

Figure 3:
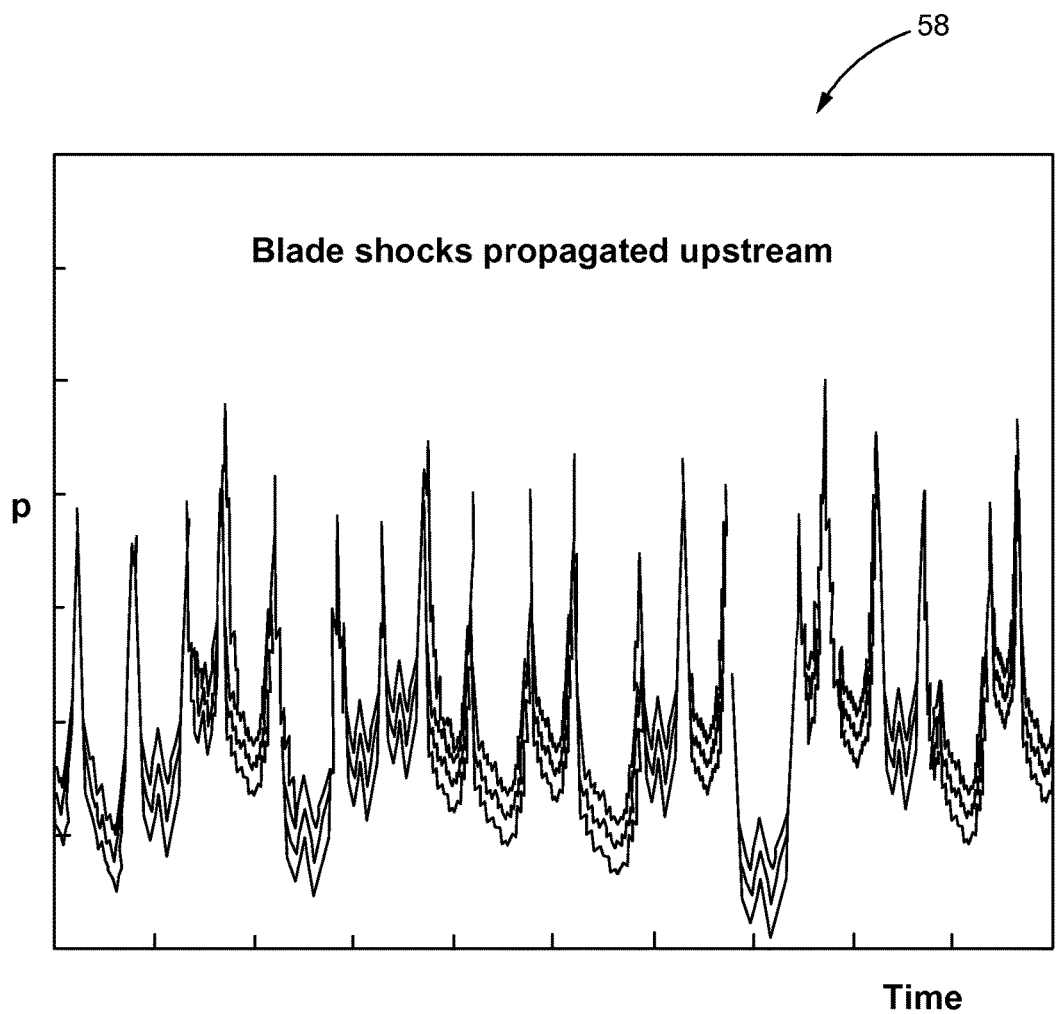
FIG. 3 is a graph of a pressure signal over time corresponding to a fan constructed without regard to noise generation.
Figure 4:
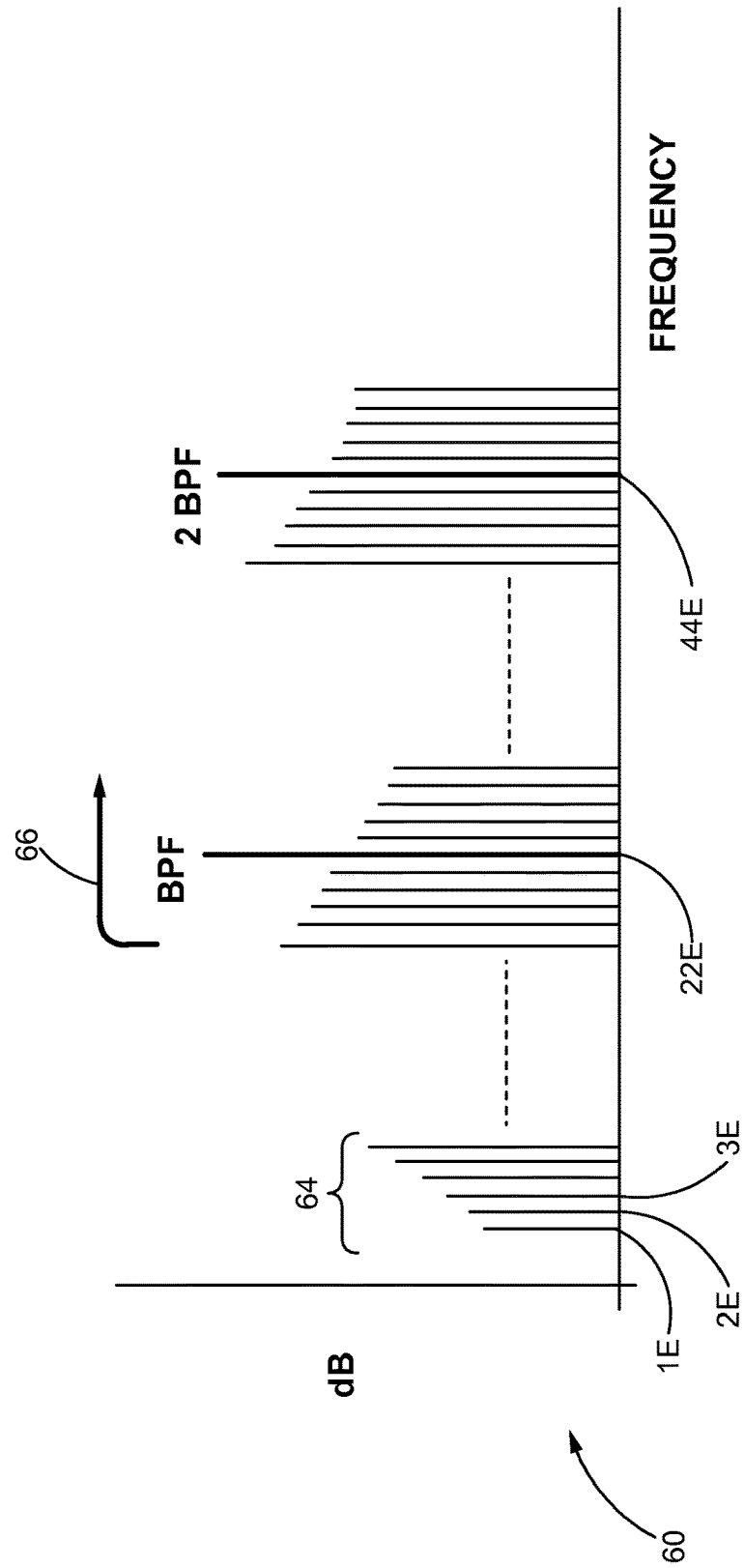
FIG. 4 is a graph of a frequency spectrum corresponding to a fan constructed without regard to noise generation.

The shocks 56 combine to form a combination tone noise, multiple tone noise, or "buzz noise" noise that may be observed by a person forward of the fan 24 as a complex time varying pressure signal 58 such as the one presented in FIG. 3, which may be undesirable to passengers in an aircraft utilizing the engine 20 for propulsion or for people in a surrounding community. This pressure signal 58 is composed of a number of harmonics, such as the harmonics presented in the frequency spectrum 60 of FIG. 4. These harmonics can be divided into two groups, decay-prone and decay-resistant, also known as propagating or cut-on harmonics. The decay-prone harmonics are those harmonics that have an acoustic energy amplitude that decays naturally before traveling a distance d from the blades 52, the largest distance d a harmonic may travel and still be considered decay-prone is the distance from the blades 52 to a lip 62 of the nacelle 38 as seen in FIG. 1. A decay-resistant harmonic does not decay before the distance d. The decay-prone harmonics are typically those harmonics that have a lower frequency, such as the first engine order harmonic (1E), which repeats once per revolution of the fan 24, indicated as a first group 64 of harmonics in FIG. 4. The decay-resistant harmonics may be the harmonics with a higher frequency, such as harmonics close to a blade passing frequency (BPF) or multiples thereof, where the BPF and multiples thereof are the harmonics that occurs if all blades are indistinguishable. The frequency spectrum 60 illustrated in FIG. 4 corresponds to a fan having twenty-two blades, and therefore the BPF is the harmonic that repeats twenty-two times per revolution of the fan 24. These decay-resistant harmonics are indicated in FIG. 4 as a second group 66 of harmonics by an arrow designating frequencies greater than the first group 64.

The diameter D of the fan 24, rotational speed N of the fan 24, a local sonic speed c of air upstream of the fan 24, and a longitudinal component $M_x$ of the Mach Number of the air upstream of the fan 24, can be used to determine which harmonics are decay-prone and decay-resistant for a particular fan 24. An equation for determining which harmonics are decay-prone and which are decay-resistant is well known in the art and reproduced bellow. A separation harmonic n, or the maximum decay-prone harmonic, may be found by the given equation, n being the greatest positive integer that satisfies the below equation. The separation harmonic n thus divides the harmonics between decay-prone harmonics, those less than or equal to n, and decay-resistant harmonics, those greater than n.

$$n<(0.81/\{[\pi DN/720c(1-M_x^2)^{0.5}]-1\})^{1.504}$$

In the prior art, the drive has been to shift the harmonics generated by the fan 24 to the decay-prone harmonics. However, new engine 20 and fan 24 designs may cause the decay-prone harmonics to be generated too closely to the lip 62 to decay to acceptable levels. Therefore, a new approach to mitigating the noise generated by the fan 24 has been developed and is described herein.

This new approach is to configure the fan 24 to generate higher order decay-resistant harmonics, corresponding to higher frequency tones. With the acoustic liner 48 properly configured, these higher order harmonics may be passively mitigated where the lower order harmonics could not be. The higher order harmonics may be effectively mitigated by a shallower acoustic liner 48 than acoustic liners or nacelle inlets necessary for the lower order harmonics to decay. The shallower acoustic liners 48 reduce the size and weight of the engine, which is more desirable in an aircraft engine.

The physical nonuniformities of the blades 52 may be used to configure the fan 24 to generate the higher order harmonics desired. For example, the pitch angle λ may be used to calculate a distribution of the blades 52 to generate any harmonic m, where m is a positive integer greater than n. Each blade 52 may be positioned so that the array generates decay-resistant harmonics that can then be mitigated by the acoustic liner 48. The blades may also be distributed such that the blades 52 cooperate to generate a single dominant harmonic m. The acoustic liner 48 may thus be configured to attenuate: a plurality of individual harmonics each having an order greater than n or one dominant harmonic m that the blades 52 cooperate to form.

The equation:

$$\lambda = A_o + A_1 \sin(\theta+\varphi_1) + A_2 \sin(2\theta+\varphi_2) + \ldots$$

may be used to determine the distribution of a set of blades 52 where the pitch angle λ is known for each blade 52. In the equation, $A_k$ is an amplitude of each harmonic, θ is an angular location of each blade 52, and $\varphi_k$ is a harmonic-specific phase angle. With this information the fan 24 may be assembled in such a way that only harmonics having orders m greater than n are generated having appreciable amplitudes. Specifically, a single harmonic order may be targeted such that the fan 24 generates this dominant harmonic. The acoustic liner 48 may be configured to attenuate the high order harmonics, or specifically the dominant harmonic over the others, thereby mitigating the noise generated by the fan 24.

INDUSTRIAL APPLICABILITY

From the foregoing, it can be seen that the technology disclosed herein has industrial applicability in a variety of settings such as, but not limited to mitigating noise generated by rotors. This may be accomplished by distributing blades of a rotor to generate decay-resistant harmonics and then attenuating those harmonics with an acoustic liner configured for the harmonics generated.

While the present disclosure has been made in reference to a gas turbine engine and an aircraft, and specifically to a fan for a gas turbine engine, one skilled in the art will understand that the teachings herein can be used in other applications as well such as, but not limited to, any rotor having a plurality of radially extending blades where any blade has a physical nonuniformity and noise generated by the rotor is a concern. It is therefore intended that the scope of the invention not be limited by the embodiments presented herein as the best mode for carrying out the invention, but that the invention include all equivalents falling within the spirit and scope of the appended claims as well.

What is claimed is:

1. A gas turbine engine having a rotor, the rotor comprising:
   a rotor disk;
   a plurality of blades extending radially outward from the rotor disk, at least one blade having a physical nonuniformity, the blades being distributed about the rotor disk based on any physical nonuniformities of the blades to generate at least one decay-resistant harmonic; and
   an acoustic liner positioned proximate to the rotor and configured to attenuate the at least one decay-resistant harmonic, wherein all the plurality of blades cooperate to generate a single dominant decay-resistant harmonic.

2. The gas turbine engine of claim 1, wherein each blade of the plurality of blades has a pitch angle, a leading edge position, and an angular offset relative a circumferentially adjacent blade, the physical nonuniformity of any blade being at least one of the pitch angle, the leading edge position, and the angular offset.

3. The gas turbine engine of claim 1, wherein the plurality of blades are distributed to form a plurality of decay-resistant harmonics.

4. A gas turbine engine having a rotor, the rotor comprising:
   a rotor disk;
   a plurality of blades extending radially outward from the rotor disk, at least one blade having a physical nonuniformity, the blades being distributed about the rotor disk based on any physical nonuniformities of the blades to generate at least one decay-resistant harmonic; and
   an acoustic liner positioned proximate to the rotor and configured to attenuate the at least one decay-resistant harmonic, wherein the acoustic liner attenuates an amplitude of a dominant decay-resistant harmonic of the rotor.

5. The gas turbine engine of claim 1, wherein the acoustic liner attenuates an amplitude of a plurality of decay-resistant harmonics.

6. The gas turbine engine of claim 1, wherein the rotor is a fan of a gas turbine engine.

7. A method of reducing combination tone noise in a rotor of a gas turbine engine, comprising:
   distributing a plurality of blades about a rotor disk of the rotor such that the blades generate a decay-resistant harmonic;
   attenuating the decay-resistant harmonic with an acoustic liner positioned proximate to the rotor, wherein the acoustic liner attenuates an amplitude of a dominant decay-resistant harmonic of the rotor.

8. The method of claim 7, wherein the plurality of blades are distributed such that a plurality of decay-resistant harmonics are generated by the blades and the acoustic liner attenuates the plurality of decay-resistant harmonics.

9. The method of claim 7, further comprising determining a distribution of the blades based on at least one physical nonuniformity of at least one blade before distributing the blades about the rotor disk.

10. The method of claim 9, wherein each blade has a pitch angle, a leading edge position, and an angular offset relative a circumferentially adjacent blade, any physical nonuniformity of the blades used to determine blade distribution being at least one of the pitch angle, the leading edge position, and the angular offset.

11. The method of claim 7, further comprising providing the rotor as a fan of a gas turbine engine.

12. A method of mitigating combination tone noise generated by a rotor of a gas turbine engine, comprising:
providing a rotor having a rotor disk and a plurality of blades extending from the rotor disk, at least one blade having a physical nonuniformity;
generating a decay-resistant harmonic with a particular positioning of the blades of the rotor based on any nonuniformities of the blades; and
attenuating the decay-resistant harmonic with an acoustic liner positioned proximate to the rotor, wherein the blades cooperate to generate a dominant decay-resistant harmonic.

13. The method of claim 12, wherein the attenuating step includes attenuating an amplitude of the decay-resistant harmonic with the acoustic liner.

14. The method of claim 12, wherein the blades are provided in a distribution that generates a plurality of decay-resistant harmonics and wherein the acoustic liner is configured to attenuate the plurality of decay-resistant harmonics.

15. The method of claim 12, wherein each blade has a pitch angle, a leading edge position, and an angular offset relative a circumferentially adjacent blade, any physical nonuniformities of the blades used to determine the distribution of the blades being at least one of the pitch angle, the leading edge position, and the angular offset.

16. The method of claim 12, further comprising providing the rotor as a fan of a gas turbine engine.

* * * * *